United States Patent
Khavari

[11] Patent Number: 6,054,084
[45] Date of Patent: Apr. 25, 2000

[54] METHOD OF MAKING A GAS RECOMBINANT BATTERY SEPARATOR

[76] Inventor: Mehrgan Khavari, 7300 NW. Lowrie La., Corvallis, Oreg. 97330

[21] Appl. No.: 09/265,081

[22] Filed: Mar. 9, 1999

Related U.S. Application Data

[62] Division of application No. 08/839,391, Apr. 11, 1997, Pat. No. 5,928,811.
[51] Int. Cl.[7] ............................. H01M 2/16; B29C 59/00
[52] U.S. Cl. ......................... 264/120; 264/122; 428/331; 429/252
[58] Field of Search ..................................... 264/120, 122; 428/331; 429/252

[56] References Cited

U.S. PATENT DOCUMENTS

| | | |
|---|---|---|
| 4,153,661 | 5/1979 | Ree et al. . |
| 5,009,971 | 4/1991 | Johnson et al. . |
| 5,071,610 | 12/1991 | Hagen et al. . |
| 5,582,892 | 12/1996 | Anderson . |

*Primary Examiner*—John S. Maples
*Attorney, Agent, or Firm*—Robert E. Howard

[57] ABSTRACT

A recombinant lead acid battery separator formed of a PTFE fibril matrix and a particulate, amorphous silica filler enmeshed in the PTFE matrix. The separator has a tensile strength greater than 0.5 MPa, a bulk density lower than about 0.40 gram/cc and a void volume greater than about 75%. The separator is made by mixing together PTFE and a non-evaporative lubricant, adding amorphous silica during mixing, continuing mixing until a material having a dough-like consistency is obtained, removing the dough-like material and calendering it to form a sheet, removing from about 95% to about 100% by weight of the non-evaporative lubricant from the sheet by solvent extraction, and drying the extracted sheet.

7 Claims, No Drawings

METHOD OF MAKING A GAS RECOMBINANT BATTERY SEPARATOR

This is a division of application Ser. No. 08/839,391 filed Apr. 11, 1997, now U.S. Pat. No. 5,928,811.

BACKGROUND OF THE INVENTION

This invention relates to a battery separator for use in a gas recombinant type lead acid battery and to a method of making the separator.

In lead acid batteries the positive and negative electrodes or "plates" are separated by a battery separator. In recombinant type lead acid batteries the separator is a porous mat wettable by the electrolyte. Substantially all of the electrolyte in a recombinant type lead acid battery is contained in the separator.

The separator of choice in recombinant batteries currently produced is a glass fiber mat. Typically such glass fiber mats have a basis weight of between about 140 and about 170 grams/square meter. Glass fiber separators do not have good puncture resistance and cannot be formed into an envelope around a plate.

U.S. Pat. No. 5,009,971 discloses a gas recombinant separator that is a non-woven, porous flexible sheet consisting essentially of a substantially homogeneous mixture of from 93 to 99.5 weight percent amorphous silica and from 0.5 to 7 weight percent of fibrillated, unsintered polymeric material, preferably polytetrafluoroethylene ("PTFE"). However, the tensile strength of this separator sheet is too low, less than 75 pounds per square inch, and its bulk density is too high to make it an economical alternative to glass mat.

U.S. Pat. No. 4,153,661 discloses a method of making PTFE composite sheet material. The method comprises dry blending a particulate material (such as silica) and PTFE particles in a weight ratio of 3:1 to 50:1, adding sufficient lubricant (water) to the blend to exceed the absorptive capacity of the solids yet maintaining a putty-like consistency, mixing the putty-like mass in an intensive mixer at a temperature between 50 and 100 degrees C. for a time sufficient to cause fibrillation of the PTFE particles, biaxially calendering the putty-like mass to cause additional fibrillation and to form a self supporting sheet, and drying the sheet to remove the water. This patent discloses several uses for the sheet, including use as battery separators.

U.S. Pat. No. 5,071,610 discloses an improvement to the process (such as disclosed in U.S. Pat. No. 4,153,661) of making a sheet comprised of a PTFE fibril matrix and insoluble, non-swellable sorptive particles enmeshed in said matrix. The improvement involves using a lubricant (such as water, alcohols or other organic solvents) in an amount to exceed the absorptive capacity of the particles by at least 3 weight percent, the ratio of insoluble particles to PTFE being in the range of 40:1 to 1:4. The sheet is said to be useful for analytical and preparative purposes in separation science, and in analysis in the fields of clinical, biological and environmental sciences.

It is an object of this invention to provide a separator for a recombinant lead acid battery comprising a sheet formed of a PTFE fibril matrix and a particulate filler enmeshed in said matrix that has high tensile strength, low bulk density and high void volume.

It is a further object of this invention to provide a process for making such a separator.

SUMMARY OF THE INVENTION

The battery separator of this invention is a sheet formed of a PTFE fibril matrix and a particulate, amorphous silica filler enmeshed in the PTFE matrix, the sheet having a tensile strength greater than 0.5 MPa, a bulk density lower than about 0.40 gram/cc and a void volume greater than about 75%.

The process for forming the separator of this invention comprises mixing together PTFE and a non-evaporative lubricant to form a substantially homogeneous mix, adding silica to the mix while continuing to subject the mix to mechanical shear sufficient to fibrillate the PTFE, the silica being added in an amount such that the lubricant is present in the amount of between about 200% and about 800% by weight of the silica and the weight ratio of silica to PTFE is between about 40:1 and about 200:1, continuing the mixing until a material having a dough-like consistency is obtained, removing the dough-like material and passing it between two calender rolls to form a sheet, removing between about 95% and about 100% by weight of the non-evaporative lubricant by solvent extraction, and drying the sheet.

DESCRIPTION OF PREFERRED EMBODIMENTS

The separator of this invention is a sheet comprised of about 90% to about 99.5% by weight of amorphous silica, between about 0.5% and about 10% by weight of fibrillated PTFE, and between about 0% and about 10% by weight of a non-evaporative lubricant. Preferably, the sheet contains about 95% to about 99% by weight of amorphous silica and between about 1% and about 5% by weight PTFE and about 0% by weight of non-evaporative lubricant.

The PTFE used in forming the separator sheet of the present invention can be any of a variety of commercially available PTFE of the coagulated type used in paste extrusion. Examples of such useful forms of PTFE are TEFLON 601A and TEFLON K-10 (DuPont), Fluon CD1 (ICI), and Dyneon 2025 (Hoechst).

The silica used is a precipitated, amorphous silica. The type of silica can affect bulk density, porosity, and pore size distribution depending on particle size and surface area (measured by oil absorption). Illustrative examples of useful silicas are set forth in the examples below.

The lubricant or plasticizer used should be a non-evaporative liquid that is removed from the finished sheet by solvent extraction. The lubricant selected should have a boiling point higher than the processing temperatures. The preferred lubricants are petroleum hydrocarbon oils. Other suitable lubricants include organic esters, such as the sebacates, stearates, adipates, phthalates and citrates; epoxy compounds, such as epoxidized vegetable oil; phosphate esters, such as tricresyl phosphate; and natural oils such as tall oil and linseed oil.

One of the key features of this invention is in discovering that by using a non-evaporative lubricant and in large quantities (about 200% to about 800% by weight of the silica) a sheet with a much lower bulk density can be obtained.

The solvent used in removing the lubricant from the sheet can be any material that is liquid at room temperature and can dissolve the lubricant selected. Where the lubricant is a petroleum hydrocarbon oil, suitable solvents include: chlorinated hydrocarbons, such as trichloroethylene, 1,1,1-trichloroethane, methylene chloride, perchloroethylene, tetrachloroethylene, carbon tetrachloride, etc.; hydrocarbon solvents, such as hexane, benzene, petroleum ether, toluene, cyclohexane, etc.; and chlorofluorocarbons, such as trichlorotrifluoroethane.

In producing the separator sheet of the present invention, the lubricant and PTFE are mixed together in a suitable mixer. A suitable mixer is one which can subject the PTFE, silica, lubricant mixture to sufficient shear forces to fibrillate the PTFE at the processing temperature chosen. The higher the processing temperature, the faster fibrillation occurs.

Suitable temperature ranges for the mixing step are between about 50 and about 200 degrees C.

The time required for mixing the PTFE and lubricant should be sufficient to form a substantially homogeneous mixture.

The time required for mixing after the addition of the silica depends on process temperature, but generally can be determined by observing the torque of the mixer motor; it will begin to rise after the addition of the silica and reach a steady state after a few minutes; mixing should be complete after reaching a steady state torque. The mixed mass will have a dough-like consistency.

The dough-like material is then removed from the mixer and calendered at a temperature between room temperature (about 20 degrees C.) and a temperature below the boiling point of the lubricant.

The sheet may be biaxially calendered by passing the material into and through the nip formed by two calender rolls to form a sheet, folding the sheet on itself and rotating the folded sheet 90 degrees, and repeating the process for several passes to form a sheet wherein the PTFE fibrils are biaxially oriented. The gap between the calender rolls is selected in accordance with the thickness of the sheet desired. The number of passes through the calender depends on the concentration of PTFE in the sheet; the higher the concentration requires more passes to make a flawless sheet. Generally, from 2 to 20 passes is sufficient.

Although the prior art uses biaxial calendering to form fibrillated PTFE sheets, it has been found that the separator sheets of this invention can be formed on a continuous basis by uniaxial calendering. This is effected by carrying out the mixing step in a single screw or, preferably, a twin screw extruder where fibrillation of the PTFE takes place. Instead of an extruder, continuous mixers such as Farrel (FMC) may be used. The extrudate from the extruder is then passed through a sheet die and into the nip of a two roll calender for a single pass through.

The calendered sheet is then contacted with a solvent for the lubricant to remove the lubricant from the sheet. The amount of lubricant removed from the sheet should be between about 95% and about 100%. The extraction can be carried out in a single or multiple steps, depending upon the amount of lubricant to be removed. Even with multiple extractions there will always be some residual lubricant left in the sheet; therefore the upper limit of "about 100%" means a percentage approaching, but never quite reaching, 100%, and the amount of lubricant remaining in the extracted sheet will approach, but never quite reach, 0% by weight of the sheet. The amount of lubricant left in the sheet should not exceed about 10% by weight of the sheet, and preferably should be less than about 5% by weight of the sheet.

The resulting sheet has a tensile strength between about 0.5 MPa and about 2.0 MPa. Tensile strength is measured on an Instron universal tester.

The bulk density of the sheet should be between about 0.2 gram/cc and about 0.4 gram/cc, preferably between about 0.2 gram/cc and about 0.35 gram/cc. Bulk density is determined by weighing a known geometrical shape of the sheet and dividing the weight of that sheet by its volume.

The void volume of the sheet should be above about 75%, preferably above about 90%, and as high as can be reasonably be achieved, generally about 95%. Void volume is measured by soaking the sample of known volume into a liquid of known density and recording the weight difference before and after wetting.

Pore size distribution will range between about 0.05 and about 5.0 microns. Pore size distribution is measured by a PMI capillary porometer.

The sheet's thickness should be that required by the recombinant battery maker, generally between about 0.015 and about 0.120 inch.

The following examples illustrate the present invention, but are not intended to limit the scope of the invention as modifications and variations will be apparent to those skilled in the art.

EXAMPLE 1

A mixture of 40 grams of mineral oil (Tufflo made by Lyondell)) and 0.15 grams of PTFE (TEFLON 601A) was mixed in the rheomix chamber of 69 ml capacity of a Haake laboratory mixer at 75 degrees C. until a substantially homogeneous mix was obtained. To this mix was added 9.5 grams of silica (PPG LXR 175, milled) with the mixing blades rotating at 100 rpm. Within minutes the torque increased, indicative of the onset of fibrillation of the PTFE. After the torque level reached a steady state, the motor was stopped and the sample, a dough-like lump, was removed and passed through the nip of a Brabender 2 roll mill. The nip had an opening of 0.040 inch. The sample was calendered at 90 degrees C. and 12 rpm. The calendered sample was removed, folded on itself, rotated 90 degrees, and fed back through the nip of the calender. The sample was passed through the nip a total of five times. The resulting flat sheet was placed on a screen and placed in a 2 liter beaker of trichloroethylene for extraction of the oil. The beaker, with a magnetic stirring bar, was placed on a hot plate to achieve an extraction temperature of 65 degrees C. After a substantial amount of oil had been removed, the extraction procedure was repeated. The sheet was removed and dried in a fume hood at 25 degrees C. The resulting sheet had a residual oil content of 3% by weight of the original amount. The sheet had a porosity of 89% and a bulk density of 0.30 gram/cc.

EXAMPLES 2–5

The procedure of Example 1 was repeated using different silicas. The following are the silicas and results obtained:

| Example | Silica | % Silica | % PTFE | Density | % Void Vol. |
| --- | --- | --- | --- | --- | --- |
| 2 | LXR219* | 98.7 | 1.3 | 0.29 | 85.8 |
| 3 | LXR175um* | 98.7 | 1.3 | 0.34 | 86.2 |
| 4 | Sip50s** | 98.5 | 1.5 | 0.30 | 92.4 |
| 5 | FK500LS** | 98.2 | 1.8 | 0.25 | 92.4 |

*Manufacture by PPG; um means unmilled
**Manufactured by Degussa

I claim:

1. A process of making a battery separator for a recombinant lead acid battery comprising mixing together PTFE and a non-evaporative lubricant to form a substantially homogeneous mix, adding amorphous silica to the mix and continuing mixing under mechanical shear forces sufficient to fibrillate said PTFE, upon achieving sufficient fibrillation to form a dough-like mass subjecting said mass to calendering to form a sheet, removing between about 95% and about 100% by weight of said non-evaporative lubricant, and drying said sheet.

2. The process of claim 1 wherein said PTFE and silica are present in amounts such that the PTFE constitutes between about 0.5% and about 10% by weight of the total weight of the PTFE and silica, and the silica is present in an amount that constitutes about 90% to about 99.5% by weight of the total weight of the PTFE and silica.

3. The process of claim 1 wherein said non-evaporative lubricant is present in an amount of between about 200% and about 800% by weight of the silica.

4. The process of claim 1 wherein said non-evaporative lubricant is a petroleum hydrocarbon oil.

5. The process of claim 1 wherein said non-evaporative lubricant is a mineral oil.

6. The process of claim 1 wherein the PTFE in said sheet is biaxially oriented during calendering.

7. The process of claim 1 wherein the PTFE, silica and non-evaporative lubricant are subjected to fibrillating mechanical shear in an extruder, and the extrudate from the extruder is continuously passed through a calender to uniaxially orient the PTFE fibrils.

* * * * *